July 22, 1924.
D. BOURQUE
TURNBUTTON FASTENER
Filed Nov. 15, 1921
1,501,982
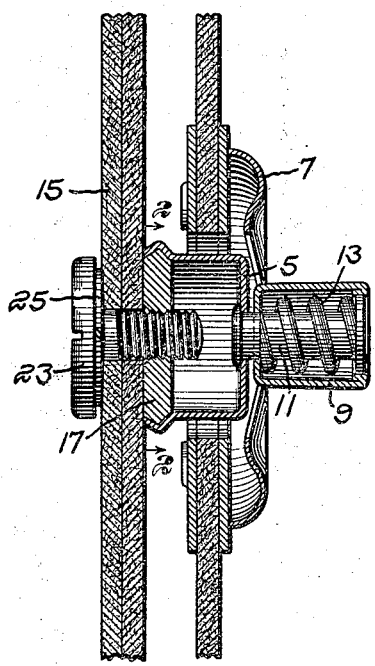
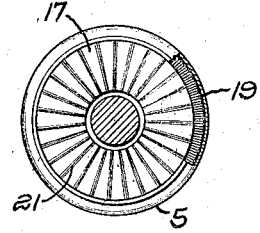
Inventor:
David Bourque, Patented July 22, 1924.

1,501,982

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

TURNBUTTON FASTENER.

Application filed November 15, 1921. Serial No. 515,402.

*To all whom it may concern:*

Be it known that I, DAVID BOURQUE, a citizen of the United States, and a resident of Amesbury, county of Essex, and State of Massachusetts, have invented an Improvement in a Turnbutton Fastener, of which the following description, in connection with the accompanying drawings, is a specification, like characters on the drawings representing like parts.

This invention relates to turnbutton fasteners and more particularly to a construction for securing them in position on the members which carry them. While of general application the construction has particular advantages when the turnbutton is fastened to a flexible member such as a curtain or other fabric.

My invention will best be understood by reference to the following description of an illustrative embodiment thereof shown by way of example in the accompanying drawings, wherein:

Fig. 1 is a central vertical section through a turnbutton fastener and its cooperating eyelet; and Fig. 2 is a section on the line 2—2 of Fig. 1 with a part broken away.

Referring to the drawings, I there show a turnbutton having a base 5 which is adapted to be encircled by the eyelet 7 which is held in encircling relation to the base by the button member or head 9 swivelled on the front of the base and adapted to be turned into traversing position over the sides of the eyelet. In the example here shown the base member 5 is struck up from sheet metal and preferably the turnbutton is of the type disclosed in my application Serial No. 445,353, filed February 16, 1921, wherein the head 9 turns on the rivet 11, upset against the front wall of the base 5, and wherein the head is pressed into cooperating relation with the base by means of a spring 13 housed within the head 9 and exterior to the base, thus leaving the interior of the base unobstructed and providing certain advantages which will hereafter appear.

To attach the turnbutton to a supporting member such as the curtain 15 the base member 5 is arranged to present at the rear thereof a suitable female thread and this may be conveniently effected by clamping in the open end of the stamping of which this base is formed a nut 17 preferably provided with the milled edge 19 (see Fig. 2) to prevent it from turning in the base 5 and which also may be provided with corrugations or striations 21 on its rear face to enable it to take a grip on the fabric or curtain 15. A suitable screw 23 of the machine screw type is adapted to pass through the member 15 and tap into the nut 17 clamping the curtain 15 between the nut and the head of the screw and a spring washer 25 is preferably provided to increase the security of the fastening.

In a turnbutton of the type disclosed wherein the hollow base 5 is substantially entirely unobstructed it will be noted that there is nothing in the way of the shank of the screw 23, which may project freely into the base and thus slight differences in thickness of the supporting member 15 are provided for. Hitherto in fastening turnbutton members to fabric it has been customary to employ some type of fastening shank which is upset or burred over. In securing these members the operator may set them inaccurately or may damage the curtain in setting them. If one setting is spoiled the curtain is practically certain to be damaged when the poor work is removed to permit a new fastener to be placed in position. By the construction here illustrated, however, it is impossible to damage the curtain, replacements in case any of the parts are broken are simply made and the finish of the work is neat and attractive.

Having described in detail the particular embodiment of my invention shown by way of example in the accompanying drawings, what I claim as new and desire to secure by Letters Patent I shall express in the following claims:

1. A turnbutton fastener of the type having the spring in the head or button and having a hollow base, a nut in the base and a screw tapping into the nut from the rear to provide means for securing the fastener to a support.

2. A turnbutton fastener comprising a hollow base adapted to be embraced by an eyelet, a head or button swivelled thereon, a nut received in the base inwardly of the rear bounding plane thereof whereby the base may be seated flat against a support and a screw tapping into the nut from the rear to provide means for securing the fastener to a support.

3. A turnbutton fastener comprising a base adapted to be embraced by an eyelet and presenting at its rear a female thread, a head swivelled on the front of the base, spring means exterior of the base for pressing base and head together and a screw entering said thread from the rear providing means for securing the fastener to a support.

In testimony whereof, I have signed my name to this specification.

DAVID BOURQUE.